United States Patent [19]

DuVall

[11] Patent Number: 4,532,602
[45] Date of Patent: Jul. 30, 1985

[54] DEVICE FOR ELECTRICAL VARIABLE MAGNIFICATION OF DOCUMENT IMAGE

[75] Inventor: Dale R. DuVall, Keller, Tex.

[73] Assignee: The Mead Corporation, Dayton, Ohio

[21] Appl. No.: 355,807

[22] Filed: Mar. 8, 1982

[51] Int. Cl.³ .................. G06G 7/30; G06F 15/40
[52] U.S. Cl. ............................ 364/577; 340/731; 355/55; 364/518; 382/47
[58] Field of Search ............ 364/518, 577, 523, 519, 364/728; 382/47, 50, 54; 340/722, 728, 731; 355/55, 60; 358/267, 285, 293, 294

[56] References Cited

U.S. PATENT DOCUMENTS

| | | | |
|---|---|---|---|
| 3,272,918 | 9/1966 | Koll et al. | 178/6.6 |
| 3,541,245 | 11/1970 | Wilby | 178/6.7 |
| 3,784,981 | 1/1974 | Borowski, Jr. et al. | 340/146 |
| 3,829,209 | 8/1974 | Buddendeck et al. | 355/14 |
| 3,976,982 | 8/1976 | Eiselen | 340/172.5 |
| 4,129,377 | 12/1978 | Miyamoto et al. | 355/14 |
| 4,153,896 | 5/1979 | White | 340/731 |
| 4,163,605 | 8/1979 | Yamada | 358/287 |
| 4,193,092 | 3/1980 | Stoffel | 358/136 |
| 4,205,350 | 5/1980 | Gunning | 358/296 |
| 4,211,482 | 7/1980 | Arai et al. | 355/8 |
| 4,214,276 | 7/1980 | Pugsley et al. | 358/256 |
| 4,216,378 | 8/1980 | Monette | 250/201 |
| 4,225,931 | 9/1980 | Schwefel | 364/577 |
| 4,231,097 | 10/1980 | Shibayama et al. | 364/577 |
| 4,275,450 | 6/1981 | Potter | 364/515 |
| 4,280,143 | 7/1981 | Judd | 358/260 |
| 4,295,167 | 10/1981 | Wiggins | 358/267 X |
| 4,303,947 | 12/1981 | Stoffel | 358/260 |
| 4,321,629 | 3/1982 | Ogasawara | 358/294 |
| 4,381,547 | 4/1983 | Ejiri | 364/577 |
| 4,393,375 | 7/1983 | Sugiura et al. | 364/518 X |

FOREIGN PATENT DOCUMENTS 0016299  10/1980  European Pat. Off. ............ 364/523

Primary Examiner—Gary Chin
Assistant Examiner—Kevin J. Teska
Attorney, Agent, or Firm—Biebel, French & Nauman

[57] ABSTRACT

A system for altering the size of an image by a desired magnification after optical scanning thereof provides a plurality of output scan values differing in number from the number of sampled scan signals produced during the optical scanning. The output scan values are representative of the density of the image at pixel locations spaced across the image in dependence upon a selected magnification value. The system includes scanning means for providing the sample scan signals and converter means for converting the sampled scan signals to a corresponding sequence of digital scan values. A control circuit is responsive to a selected magnification value for providing a plurality of interpolation control values in synchronism with the sequence of digital scan values. The interpolation control values indicate the spatial relationship of output scan values with respect to pairs of successive digital scan values. An interpolation circuit is responsive to the sequence of digital scan values and to the interpolation control values and interpolates between pairs of the digital scan values to provide the output scan values.

12 Claims, 7 Drawing Figures

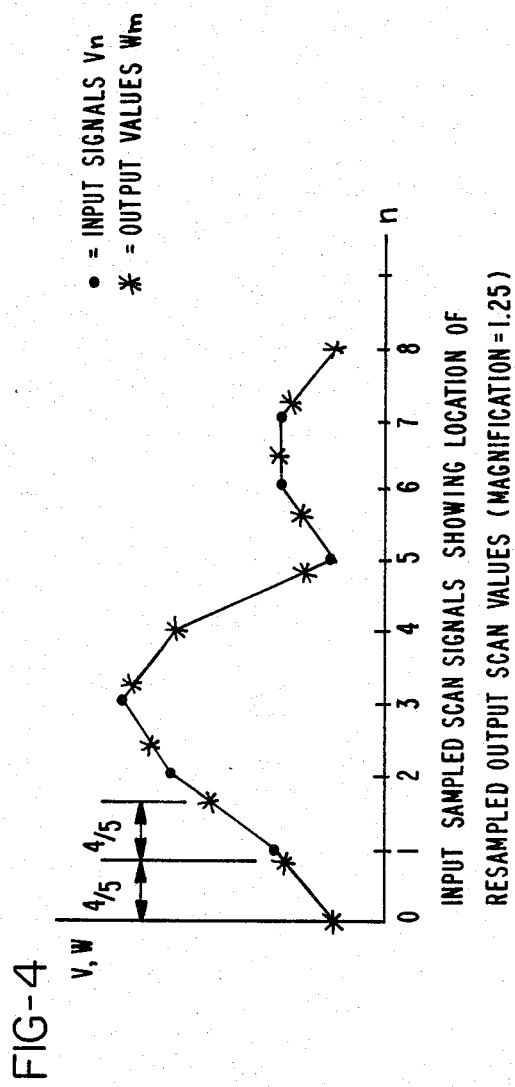

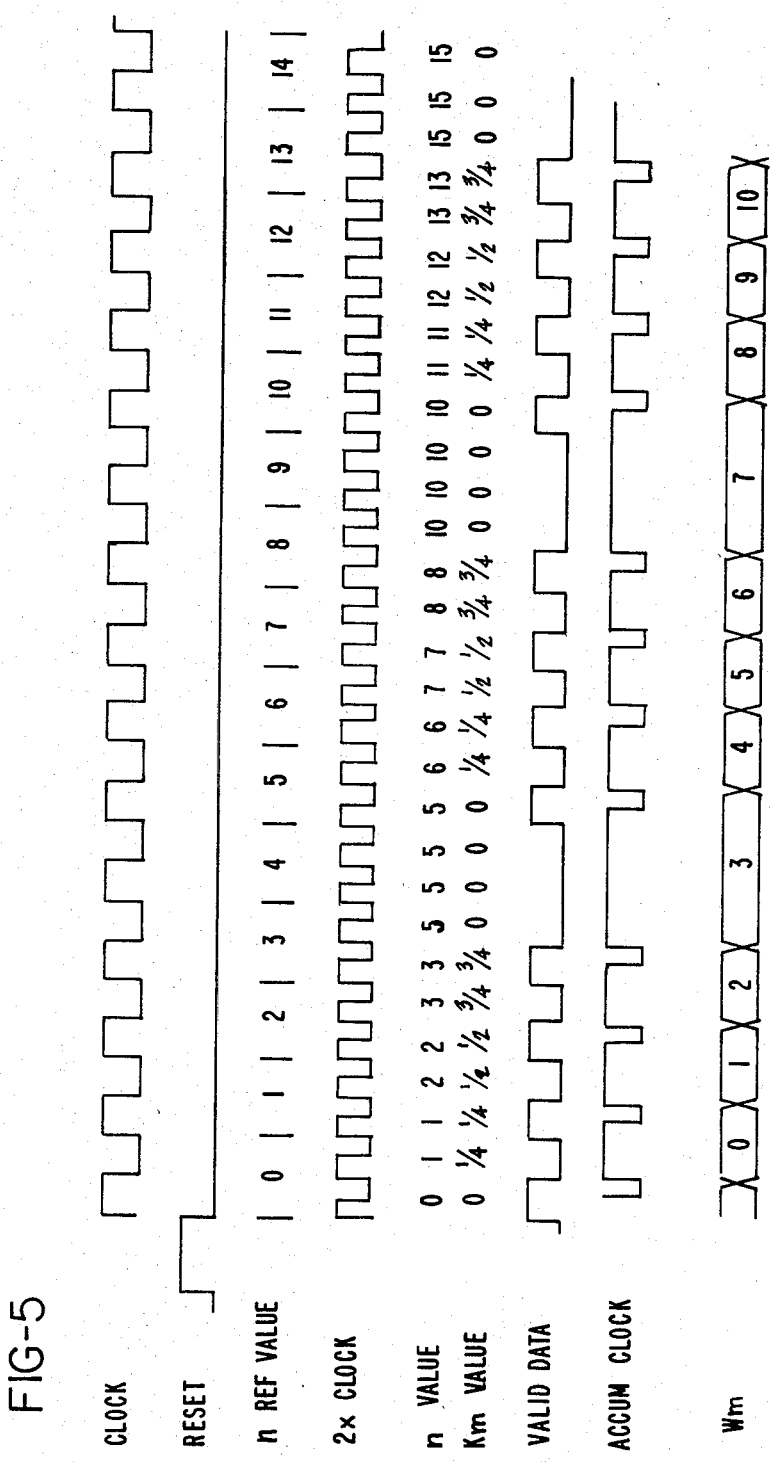

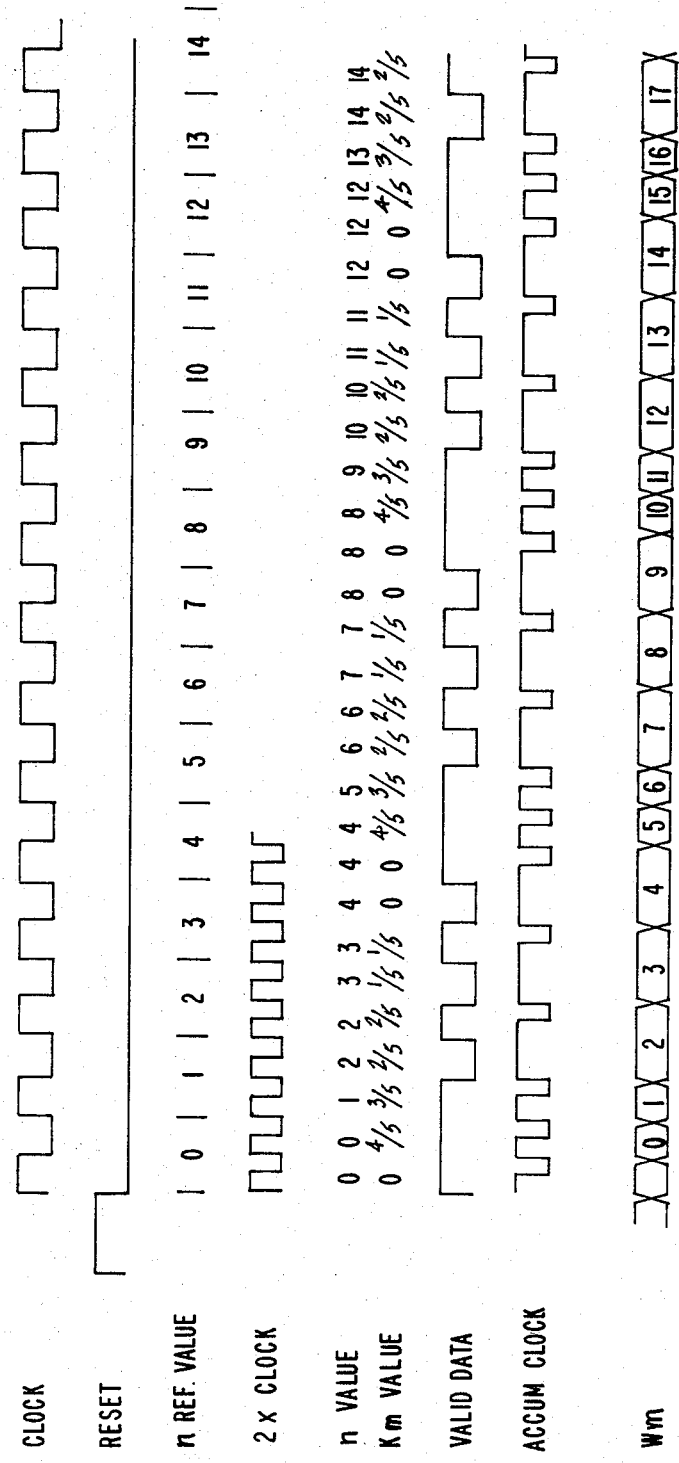

DEVICE FOR ELECTRICAL VARIABLE MAGNIFICATION OF DOCUMENT IMAGE

BACKGROUND OF THE INVENTION

The present invention relates to a system for altering the size of an image by a desired magnification and, more particularly, to such a system which electrically alters the effective image size after the image has been scanned and converted into a sequence of electrical sampled scan signals, each of which is representative of the image density at an associated pixel location in a row of pixel locations across the image.

Various optical scanning arrangements are known for scanning the image of a document and converting the scanned image into a sequence of analog or digital scan values representative of the image density at associated pixel areas on the original document. As shown in Monette U.S. Pat. No. 4,216,378, it is known to provide a scanning arrangement in which the light reflected from a document image is projected onto a phototransducer array including a plurality of separate transducers, such as photodiodes or charge coupled devices arranged in a row. A mirror arrangement in the optical system is utilized to sweep the focused document image past the row of transducers, thereby providing for complete coverage of the image.

The transducers may typically be arranged in a row such that they each receive light from a separate small pixel area on the document image. The corresponding pixel areas are arranged generally in a row across the document image. As the scanning of the image takes place in a direction perpendicular to the row of pixel areas, the scan output signals from the transducers are repetitively loaded into an associated shift register and shifted out serially. Thus, the transducer array provides a series of scan signal sequences with the scan values in a sequence corresponding to the image density of respective pixel areas in a corresponding row of pixel areas across the document image. The scan signal sequences may be used to control a printer, such as an ink jet printer, for duplicating or reproducing the original scanned image. Alternatively, the scan signal sequences may be supplied to circuitry providing image enhancement, facsimile transmission, character recognition, or other functions.

It will be appreciated that it may be desirable to be able to alter the effective size of the scanned image. If the scan signals are to be used in a copier or duplicator to control printing, as by an ink jet printer, of the original document image, it is sometimes desired to print either an enlarged or reduced version of the image. If, on the other hand, the sampled scan signals are supplied to a character recognition circuit, it is desirable that the effective size of the character images be enlarged or reduced to a standard character size.

Image reduction or enlargement may be accomplished in several ways. As shown in Miyamoto et al U.S. Pat. No. 4,129,377 and Buddendeck et al U.S. Pat. No. 3,829,209, it is common in xerographic copiers to provide an adjustable lens system which optically alters the size of the image projected onto the photosensitive substrate. Such an optical arrangement is relatively complicated, however, and has numerous disadvantages, including the difficulty in maintaining image edge registration over the entire range of possible enlargements and reductions.

Image reduction or enlargement may also be accomplished electrically in those systems in which electrical scan signals are produced. Borowsky et al U.S. Pat. No. 3,784,981 discloses an electronic image reduction system which is utilized to standardize the height of character images prior to supplying scan signals to a character recognition device. The Borowsky et al system produces eight identical scan signals from each photosensor in a row of photosensors. More than eight of the scan signals are then grouped and averaged to produce adjusted scan output signals. As a result, the adjusted scan output signals are fewer in number than the number of photosensors in the scanning device, thereby effectively reducing electrically the size of the image scanned. In this arrangement, the magnitude of an adjusted scan output signal may be determined by two, three, or four adjacent photosensor outputs, depending upon the degree of image reduction required. The Borowsky et al system is limited in that it is only capable of image reduction and may not be used to enlarge an image.

Similarly, Stoffel U.S. Pat. No. 4,193,092 discloses a magnification system in which the outputs from a row of photosensors are sampled, interpolated, and filtered to produce an analog signal having a voltage which varies in dependence upon the image density of the image across the document. This analog signal is compared with a reference threshold value to produce a binary square wave signal. The binary square wave signal is then sampled at a greater number of points than the number of photosensors to produce "print" or "no print" output signals defining an enlarged image. The Stoffel system is only capable of image magnification and, further, is limited in image resolution since resampling occurs subsequent to production of a binary signal.

Iselen U.S. Pat. No. 3,976,982 discloses an image manipulation system in which reduction of an image is accomplished by taking rectangular cells of pixel scan signals in binary format and applying majority logic to produce a binary "print" or "no print" signal. Enlargement of images is accomplished duplicating scan signals.

White U.S. Pat. No. 4,153,896 and Yamada U.S. Pat. No. 4,163,605 disclose image reduction by simple elimination of stored binary scan data, although averaging between scan data values may also be utilized. Magnification of images is accomplished by duplicating the binary scan data.

Gunning U.S. Pat. No. 4,205,350 discloses a reproduction system in which the scanning speed of an original document is adjusted, while the output printing speed remains constant. As a consequence, when the scanning speed is less than the printing speed, enlargement of the printed image is produced, and when the scanning speed is greater than the printing speed, an image of reduced size is produced.

Wilby U.S. Pat. No. 3,541,245 and Koll et al U.S. Pat. No. 3,272,918 disclose reproduction systems in which digital image data is stored and subsequently supplied to a digital to analog converter. The rate at which the digital image data is read out through the digital to analog converter is adjusted to stretch or to compress the analog output signal, thus providing an output signal representative of either an enlarged or reduced image.

All of the above noted prior art devices have various drawbacks. Some are not capable of providing both image enlargement and image reduction, while others provide for image enlargement simply by redundant usage of scan data signals and image reduction by deletion of scan data signals, thus resulting in a somewhat distorted output of reduced resolution.

Accordingly, it is seen that there is a need for a system for electrically altering the effective size of a scanned image by a selected magnification in which the output scan signals provide a faithful representation of the original image.

SUMMARY OF THE INVENTION

A system is provided for altering the size of an image by a desired magnification after optical scanning thereof by providing a plurality of output scan values different in number from the number of sampled scan values produced during optical scanning. The output scan values are representative of the density of the image at pixel locations spaced across the image in dependence upon a selected magnification value. A scanning means provides a sequence of sampled scan signals, each such sampled scan signal being representative of the image density at an associated pixel location in a row of pixel locations across the image. A converter means converts the sampled scan signals to a corresponding sequence of digital scan values. A control circuit means is responsive to the magnification value for providing a plurality of interpolation control values in synchronism with the sequence of digital scan values. The interpolation control values indicate the spatial relationship of output scan values with respect to selected pairs of successive digital scan values. An interpolation means is responsive to the sequence of digital scan values and to the interpolation control values for interpolating between pairs of the digital scan values to provide the output scan values. The sampled scan signals may be analog signals which are converted by an analog to digital converter.

The interpolation means may include latch means for receiving each of the digital scan values and for providing delayed digital scan values at a latch output. Interpolation means may further include read only memory means, responsive to the digital scan values from the converter means and latch means and also responsive to the interpolation control values, for providing output scan values stored at memory locations therein defined by the digital scan values and the interpolation control values.

The integrator means, responsive to the magnification value, integrates the magnification value to provide a first portion of the integral thereof as the interpolation control values. The magnification value may be equal to the reciprocal of the desired magnification of the image. The control circuit may further include a counter for counting the number of sampled scan signals received, and comparator means, responsive to a second portion of the integral of the magnification value and to the counter, for providing an integration control signal to the integrator means.

The method of the present invention of providing a sequence of output scan values differing in number from a sequence of sample scan signals produced during optical scanning of the image includes the steps of (a) providing a sequence of sample scan signals, each such sample scan signal being representative of the image density at an associated pixel location in a row of pixel locations across the image;

(b) converting the sequence of sampled scan signals to a corresponding sequence of digital scan values; and (c) sampling the sequence of digital scan values at predetermined evenly spaced points in the sequence by interpolating between pairs of successive scan values to provide a sequence of output scan values differing in number from the sequence of digital scan values.

The step of sampling the sequence of digital scan values may include the step of sampling at a frequency greater than that at which the digital scan values are produced, whereby the image is enlarged. Alternatively, the step of sampling the sequence of digital scan values may include the step of sampling at a frequency less than that at which the digital scan values are produced, whereby image reduction is produced.

Accordingly, it is an object of the present invention to provide a system and method for altering the size of an image by a desired magnification by providing a plurality of output scan values differing in number from the number of sampled scan values produced during optical scanning; to provide such a system and method in which a sequence of digital scan values, corresponding to the sequence of sampled scan signals, is sampled by means of interpolation between pairs of successive digital scan values; to provide such a system and method in which interpolation is accomplished by means of a read only memory; and to provide such a system and method in which two successive digital scan values form a portion of the address supplied to the read only memory.

Other objects and advantages of the invention will be apparent from the following description, the accompanying drawings and the appended claims.

BRIEF DESCRIPTION OF THE DRAWINGS

FIG. 4 is a wave form diagram illustrating the process of image enlargement;

FIG. 5 is a timing diagram useful in explaining image reduction; and

FIG. 6 is a timing diagram useful for explaining image enlargement.

DETAILED DESCRIPTION OF THE PREFERRED EMBODIMENT

Figure 1:
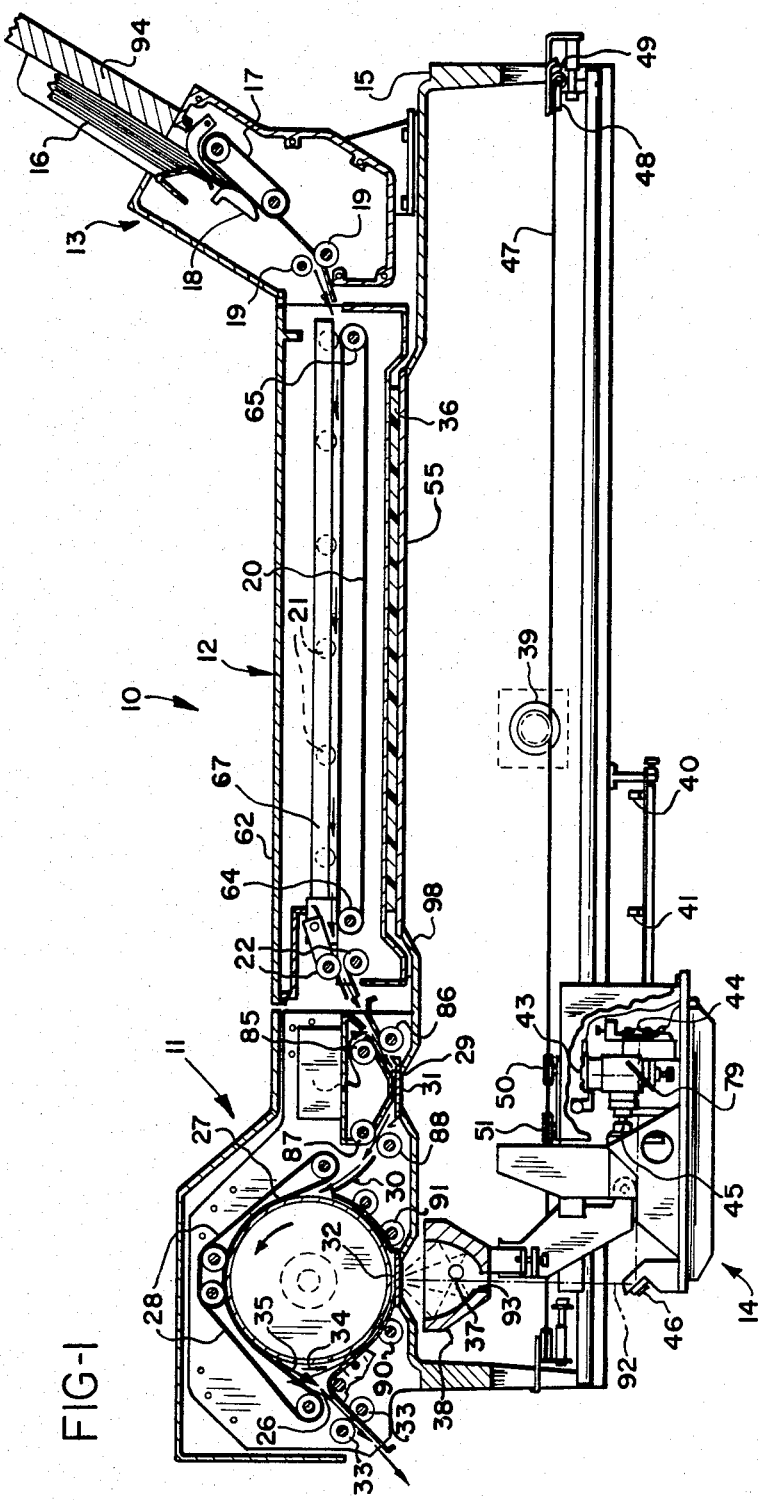
FIG. 1 is a front view, with portions in section, of an optical scanning arrangement for providing a sequence of sampled scan signals related to the image density of an image on a document.

Reference is made to FIG. 1 which illustrates an optical scanning means for providing electrical sampled scan signals which define the image on the scanned document. Each sampled scan signal is representative of the image density at an associated pixel location on the scanned document. As described more fully below, the scanning means provides a sequence of such sampled scan signals which defines the image density at pixel locations arranged in a row across the scanned document. The document scanning system 10 includes a scan station assembly 11, a platen cover 12, a document feeder assembly 13, and a scanner carriage assembly 14, all of which are supported by a frame 15.

Document exposure occurs either at a platen 55, at a first exposure station defined by scan glass 31, or at a second exposure station defined by scan glass 32. In any case, scanning is performed by optical elements mounted upon scanner carriage 14. Scan glass 31 is utilized for front side scanning of automatically fed sheet-type original documents, while platen 55 is used for exposure of either sheet-type or bulky original documents. Platen cover 12 is hinged to accommodate exposure of bulky documents.

The second exposure station defined by scan glass 32 is provided in order to accommodate reverse side scanning of automatically fed sheet-type documents, thereby providing scanning information for duplex copying. Automatic feeding of sheet-type documents is carried out such that the documents pass through the second exposure station in a direction which is opposite to the direction of passage through the first exposure station.

Scan glass 31, scan glass 32 and platen 55 are all positioned in a common plane for scanning by scanning elements carried by scanner carriage 14. The scanner elements, as hereinafter described, are adjusted for optical focusing at the common plane, and scanner carriage 14 is supported for linear motion along a path parallel to the plane so defined.

Document scanning system 10 is equipped with operator controls (not illustrated) which enable selection of either a manually initiated scanning mode (platen scanning) or an automatic document handling mode. Other controls are provided for selecting either one or two side scanning, for indicating document size, and for entering various control commands for operating the scanning system.

Where the scanning system forms a part of a duplicating device, additional controls may be provided for controlling the printer, such as for example an ink jet printer, which prints a reproduction of the scanned document image. A scan data processing system receives the electrical sampled scan signals representative of the document image from the scanning system and provides output scan values which define a version of the image which may be altered in size. The output scan values may then be processed and stored for use in generating print control signals.

It will therefore be seen that a document scanning system in accordance with this invention has the following four different operating modes:

Mode I—Manually initiated scanning of bulky documents (platen cover 12 raised).
Mode II—Manually initiated scanning of sheet-type original documents (platen cover 12 closed).
Mode III—Automatic feeding and single side scanning of sheet-type original documents
Mode IV—Automatic feeding and two-side scanning of sheet-type original documents.

As illustrated in FIG. 1, document scanning system 10 is operating in above-mentioned Mode IV. Moreover, the system is shown during that portion of a scanning cycle when the reverse side of a sheet is being scanned. At that particular time, scanning carriage 14 is positioned such that the scanning optics are directly below scan glass 32. During Mode IV, scanner carriage 14 is driven back and forth between the position illustrated in FIG. 1 and a position in which the scanning optics are below scan glass 31. For operation in Mode III, scanner carriage 14 remains fixed at the scanning position below scan glass 31. In Modes I and II, the document is positioned on transparent platen 55 and remains stationary as the scanning optics are transported along the length of the document.

For operation of document scanning system 10 in either of Modes III or IV, a set of sheet-type original documents are placed face down in a stack 16 upon a receiving tray 94 of feeder 13. A feed belt 17 feeds an individual document past retard member 18. Retard member 18 effectively prevents multiple feeds, so that an individual document is fed through the nip between rollers 19.

After passage between rollers 19, the sheet-type document is received by a series of belts 20 which are mounted inside platen cover 12. Belts 20 are angularly mounted on rollers 64 and 65 for receiving a document and transporting it forward toward rollers 22 and sideward toward a registration guide (not shown). This provides accurate side registration of the documents prior to scanning at scan glass 31. Platen cover 12 also comprises a series of hold-down balls 21 mounted in a ball cage 67. Hold-down balls 21 urge a document downward against transport belts 20 without inhibiting sideward movement toward registration guide 66.

For operation in scanning Mode II, it is desirable that a clean, reflective background be provided. Thus, platen cover 12 includes a pressure pad 36 which conveniently may comprise a white polyurethane elastomer sheet bonded to a resilient polyurethane foam material. The white elastomeric sheet provides the desired reflective background, so that small size sheet-type original documents may be scanned without production of a cluttered or unsightly background.

It will be noted that transport belts 20 are positioned for guiding sheet-type original documents between lid 62 and pressure pad 36 when platen cover 12 is lowered and document scanning system 10 is engaged in either of scanning Modes III or IV.

Preferred scanning optics comprise a line source illuminator 37 and a reflector 38. The inside surface of reflector 38 defines a section of an elliptical cylinder, and illumination lamp 37 is positioned along one focal line of the elliptical cylinder. Scanner carriage 14 transports reflector 38 along a path with respect to the common plane of scan glass 31, scan glass 32 and platen 55 such that the second focal line of the elliptical cylinder coincides with the common plane. This causes a bright line of illumination to be focused upon the surface of the document being scanned at any point along the common plane. An image of that portion of a document which is so illuminated is reflected backwardly along an optical path 92 which extends through an opening 93 in the rear of reflector 38.

After passage through opening 93, optical path 92 proceeds toward a pair of photosensor arrays, such as CCD arrays 43 and 44. The path toward the CCD arrays 43 and 44 carries the reflected light downwardly for reflection from the surface of a folding mirror 46 and then through a lens 45. A lens turret with multiple lenses and an actuator for rotating the lenses may be utilized where it is desired to widen the field of view of the scanner optics.

The light then proceeds toward a beam splitter 79, which directs half of the light along a path toward CCD array 43 and half of the light along another path toward CCD array 44. CCD arrays 43 and 44 each comprises a series of charge coupled photodetectors of conventional design, such as Fairchild CCD 143 arrays. These arrays, while commercially available, are not sufficiently long for scanning across the entire width of a document. This length deficiency may be accommodated by utilizing a pair of such arrays. The two arrays are optically butted together, so that the last photodetector of CCD array 43 is optically positioned adjacent the first photodetector of CCD array 44.

By this means, each photodetector receives light reflected from an associated pixel location on the document image. The CCD photodetectors accumulate a charge related to the amount of light which they receive. During the scanning process, the charges are repetitively transferred into shift registers and shifted out of the arrays serially. As a consequence the output from the arrays 43 and 44 is a sequence of sampled scan signals which collectively defines the document image density along a line across the document width. During relative movement between the document and the scanner carriage assembly 14, a series of such sequences of sampled scan signals are produced which define the complete image. It will be appreciated that the present invention is not limited to any specific scanning system and other scanning systems may also be used in the present invention.

Figure 2:
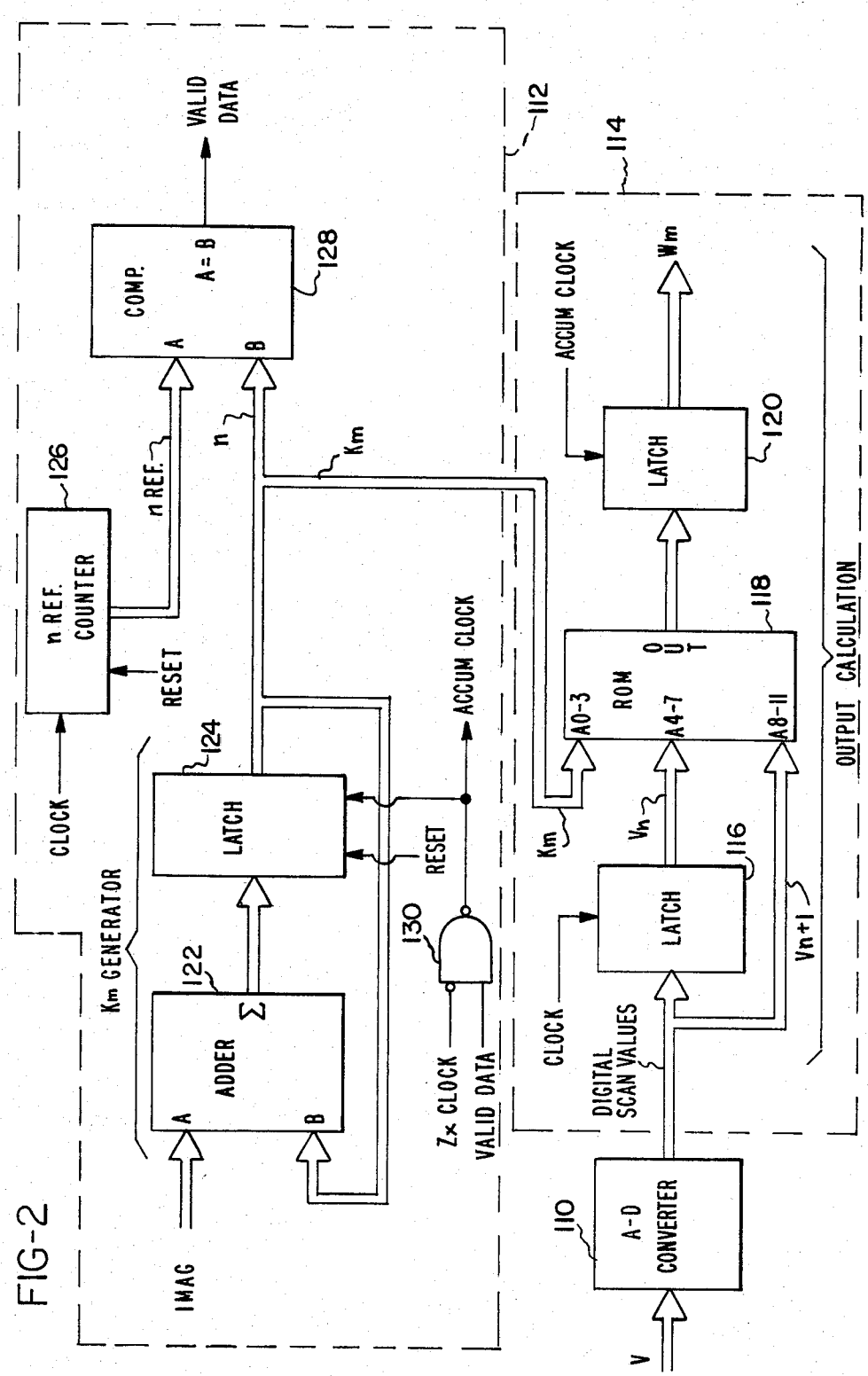
FIG. 2 is an electrical schematic illustrating the digital logic of the system of the present invention.
Figure 3A:
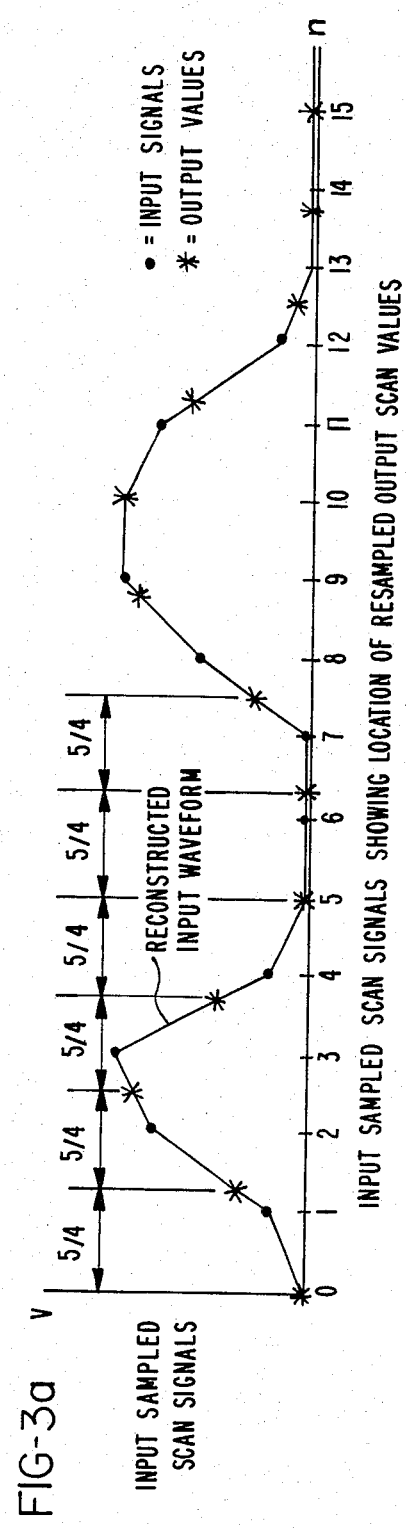
FIGS. 3a and 3b are quantizing diagrams illustrating the process of image reduction.
Figure 3B:
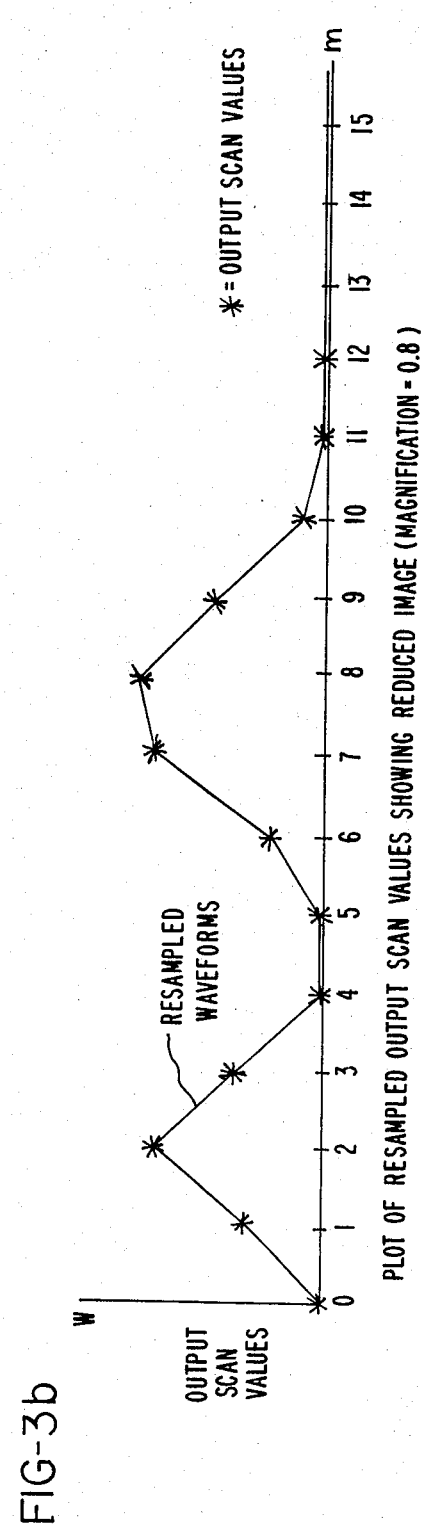

The system for effectively altering the size of the image electrically subsequent to scanning is shown in FIG. 2, and the manner in which it operates in image reduction and image enlargement is illustrated in FIG. 3a and 3b, and in FIG. 4, respectively. Basically, the system effectively reconstructs the input video wave form from the sampled scan signals produced by the optical scanner and resamples the wave form at a spatial frequency differing from that at which the sampled scan signals are produced. Resampling defines output scan values that are either spatially enlarged or reduced in dependence upon the resampling rate. Linear interpolation is utilized between successive input sampled scan signals during resampling. By this technique the document image is enlarged or reduced across the width of the image. In order to produce a corresponding enlargement or reduction in image size in a direction parallel to the direction of movement of carriage 14, the relative speed of movement between the carriage 14 and the document image is adjusted. As a consequence, the image size is adjusted in a direction parallel to the length of the original document, since the read out rate of arrays 43 and 44 remains constant.

If $V_n$ and $V_{n+1}$ are the magnitudes of the nth and (n+1)th input sampled scan signals, interpolation between these input sampled scan signals may be accomplished to derive an output scan value $W_m$ that lies between the input sampled scan signals. In order to accomplish interpolation, the location of $W_m$ must be known. Specifying the distance between successive input sampled scan signals as unity, let a variable $k_m$, termed an interpolation control value, represent the fractional distance between $V_n$ and $W_m$. The value of $W_m$ therefore may be expressed as follows:

$$W_M = (V_{n+1} - V_n)k_m + V_n$$

The value of $k_m$ is a function of the desired image magnification.

The spacing between successive output scan values $W_m$, $W_{m+1}$, $W_{m+2}$, ... is equal to the reciprocal of the magnification, where the input sampling interval is defined as unity. As an example, a magnification of 0.8, specifying image reduction, corresponds to a sampling interval of 1/0.8, or 5/4, as shown in FIG. 3a. It should be noted that the (m)th output scan value $W_m$ is a distance m/magnification from the first input sampled scan signal $V_0$, expressed in terms of n. It is apparent that the integral portion of this distance is the same as the number n for sample m and, further, that the fractional portion of this distance is the corresponding value of $k_m$.

The following table depicts the relationship of these parameters for the case where the magnification is 0.8:

| m | accumulated sampling interval | n | k |
|---|---|---|---|
| 0 | 0 | 0 | 0 |
| 1 | 5/4 | 1 | 1/4 |
| 2 | 10/4 | 2 | 1/2 |
| 3 | 15/4 | 3 | 3/4 |
| 4 | 20/4 | 5 | 0 |
| 5 | 25/4 | 6 | 1/4 |
| 6 | 30/4 | 7 | 1/2 |
| 7 | 35/4 | 8 | 3/4 |
| . | . | . | . |
| . | . | . | . |
| . | . | . | . |

Note that there is no set of values for n=4. This indicates that an output scan value does not occur between input sampled scan signals $V_4$ and $V_5$. This is apparent in FIG. 3a.

The resampled wave form produced by spacing successive output scan values apart by the same distance as successive input sampled scan signals is illustrated in FIG. 3b. Effectively, the wave form shown in FIG. 3b is simply a compressed or reduced version of the wave form of FIG. 3a. As a consequence, the width of the image defined by the wave form of FIG. 3b is effectively reduced. By correspondingly increasing the rate at which assembly 14 traverses the original document image, a corresponding dimensional reduction is provided in the length of the image.

In the enlargement mode of operation, with the magnification being greater than unity, the same value of n may appear for two consecutive values of m. This indicates that two output scan values lie between the same two input sampled scan signals. The following table lists the first few values of m and the corresponding values for n and $k_m$ for a magnification of 1.25.

| m | accumulated sampling interval | n | $k_m$ |
|---|---|---|---|
| 0 | 0 | 0 | 0 |
| 1 | 4/5 | 0 | 4/5 |
| 2 | 8/5 | 1 | 3/5 |
| 3 | 12/5 | 2 | 2/5 |
| 4 | 16/5 | 3 | 1/5 |
| 5 | 20/5 | 4 | 0 |
| 6 | 24/5 | 4 | 4/5 |
| 7 | 28/5 | 5 | 3/5 |
| . | . | . | . |
| . | . | . | . |
| . | . | . | . |

This image enlargement process magnification is illustrated in FIG. 4.

FIG. 2 illustrates the system by which images are electrically altered in size according to the present invention. Inputs to the circuitry include sampled scan signals (V), a clock signal (CLOCK) provided at the input sample rate, a clock signal at twice the input sample rate (2×CLOCK), a reset signal (RESET) preceding the beginning of each sequence of sampled scan signals, and the magnification value (IMAG) which is equal to the reciprocal of the desired magnification.

The system includes a converter means 110, such as an analog to digital converter, which converts the successive analog sampled scan signals into a corresponding sequence of digital scan values. A control circuit means 112, responsive to the magnification value IMAG, provides a plurality of interpolation control values $k_m$ which indicate the spatial relationship of output scan values with respect to pairs of successive digital scan values provided by converter 110. An interpolation means 114, responsive to the sequence of digital scan values from converter 110 and to the interpolation control values $k_m$ from control circuit means 112, interpolates between pairs of the digital scan values to provide output scan values $W_m$.

The interpolation means 114 includes a latch means 116 which receives digital scan values from the analog to digital converter 110 and provides delayed digital scan values $V_n$ at its output. The digital scan values $V_{n+1}$ and $V_n$ are in 4-bit binary form. A memory means, including ROM 118 and latch 120, is responsive to the digital scan values $V_{n+1}$ from the converter means 110 and to the digital scan values $V_n$ from the latch means 116 and, further, is responsive to the 4-bit interpolation control values $k_m$. The read only memory means provides output scan values $W_m$ which are stored at memory locations in ROM 118 defined by a 12-bit address consisting of $k_m$, $V_n$, and $V_{n+1}$.

The control circuit means 112 includes an integrator means comprising adder 122 and latch 124. The integrator means, responsive to the magnification value IMAG, integrates or accumulates the magnification value and provides a first portion of the increasing accumulated values thereof as the interpolation control values $k_m$. The fractional portions of the accumulated values are used as the interpolation control values $k_m$. Since $V_n$, $V_{n+1}$, and $k_m$, each consists of four binary bits, a 12-bit address is supplied to the ROM 118 which defines a unique storage location therein. At each storage location is stored a 4-bit binary word defining the output scan value which would result from an interpolation between the $V_n$ and $V_{n+1}$ inputs, as defined by the $k_m$ input. As a consequence, the ROM effectively performs a rapid computation of the output $W_m$, and this output is stored by latch 120 until a new $W_m$ is computed.

The control circuit means 112 includes a counter 126 which is reset at the beginning of each scan cycle, that is at the beginning of each sequence of sampled scan signals which defines the image along a row of pixel locations. The counter 126 is incremented at the input sample rate of the digital scan values. The number stored in counter 126 is one less than the input sample number then being received. As an example, if the digital scan value $V_{25}$ were being applied to ROM 118 by the analog to digital converter 110 and the latch 116 were supplying the digital scan value $V_{24}$ to ROM 118, the reference counter 126 would have a count state of 24.

A comparator means, including comparator circuit 128, is responsive to a second portion n of the integral of the magnification value. This second portion is the integral or non-fractional portion. Also supplied to the comparator means 128 is the number stored in counter 126. Comparator 128 provides a VALID DATA output when the output of latch 124 indicates that a valid output scan value falls between two successive sampled scan signals and, further, that those sampled scan signals are then being supplied to the ROM 118 from converter 110 and latch 116.

This VALID DATA output is supplied through NAND gate 130 as an ACCUM CLOCK signal to gate latches 124 and 120. As a consequence, the output of latch 124 is increased but not before latch 120 stores the previously produced output of ROM 118. It will be appreciated that the updated $k_m$ value applied to the ROM 118 at this point will not be appropriate for the $V_n$ and $V_{n+1}$ scan values being applied to the ROM. Since the output latch 120 is not gated by a further ACCUM CLOCK signal, however, the output of the ROM 118 is ignored until the appropriate $V_n$ and $V_{n+1}$ values are supplied to the ROM 118, and the latch 120 is once again gated by an ACCUM CLOCK signal.

The adder 122 and latch 124, acting as an integrator, as discussed above, provide the $k_m$ output to the ROM 118. At the beginning of each sequence of sampled scan signals from the optical scanner, the output latch 124 is reset so that the output of the adder is equal to IMAG. Each time the latch 124 is clocked, the adder's previous output value is added to IMAG, such that the output sequence progresses as follows: IMAG, 2×IMAG, 3×IMAG, etc. The integral or non-fractional portion of the latch output provides n, as discussed previously, while the fractional portion is used as $k_m$. This accumulation process is controlled by the ACCUM CLOCK signal which is the 2×CLOCK signal gated by the VALID DATA control signal.

The VALID DATA signal generation is accomplished by magnitude comparator 128 which compares the values of $n_{REF}$ and n. Whenever these two numbers are equal, it signifies that the proper $k_m$, $V_n$, and $V_{n+1}$ are available for a calculation of $W_m$.

Reference is made to FIGS. 5 and 6 which are timing diagrams illustrating the sequence of operation of the system shown in FIG. 2. In both diagrams, the representation of $W_m$ is strictly schematic, indicating the time periods during which each of the output scan values is presented. FIG. 5 shows the timing for a magnification of 0.8, while FIG. 6 illustrates the timing of the system for a magnification of 1.25.

While the present invention has been described in terms of image enlargement or reduction being accomplished electrically only in a horizontal direction across the width of a document image with the corresponding enlargement or reduction of the image along its length being accomplished by altering the rate of movement of the scanning assembly with respect to the original document image, it will be appreciated that image magnification may also be accomplished electrically in the vertical direction.

While the method herein described and the form of apparatus for carrying this method into effect constitute preferred embodiments of the invention, it is to be understood that the invention is not limited to this precise method and form of apparatus, and that changes may be made in either without departing from the scope of the invention.

What is claimed is:

1. A system for altering the size of an image by a desired magnification after optical scanning thereof by providing a plurality of output scan values different in number from the number of sampled scan signals produced during optical scanning, said output scan values being representative of the density of the image at pixel locations spaced across the image in dependence upon a selected magnification value, said system comprising:

scanning means for providing a sequence of sampled scan signals, each such sampled scan signal being representative of the image density at an associated pixel location in a row of pixel locations across said image, converter means for converting said sampled scan signals to a corresponding sequence of digital scan values, control circuit means, responsive to said magnification value, for providing a plurality of interpolation control values in synchronism with said sequence of digital scan values, said interpolation control values indicating the spatial relationship of output scan values with respect to pairs of successive digital scan values, and interpolation means, responsive to said sequence of digital scan values and to said interpolation control values, for interpolating between pairs of said digital scan values to provide said output scan values.

2. The system of claim 1 in which said sampled scan signals are analog signals and in which said converter means comprises an analog to digital converter.

3. The system of claim 1 in which said scanning means comprises means for providing a succession of sequences of sampled scan signals, each such sequence of sampled scan signals being representative of the image density at pixel locations in an associated row of pixel locations across said image, said associated rows of pixel locations being spaced apart in a direction perpendicular to said rows.

4. The system of claim 3 in which said scanning means includes means for varying the spacing between said rows in dependence upon the desired magnification.

5. The system of claim 1 in which said interpolation means comprises latch means for receiving each of said digital scan values and for providing delayed digital scan values at a latch output, and read only memory means, responsive to digital scan values from said converter means and to delayed digital scan values from said latch means and further responsive to said interpolation control values, for providing output scan values stored at memory locations therein defined by said digital scan values and said interpolation control values.

6. The system of claim 1 in which said control circuit means comprises integrator means, responsive to said magnification value, for integrating said magnification value and providing a first portion of the integral thereof as said interpolation control values and a second portion of the integral thereof.

7. The system of claim 6 in which said control circuit means further comprises a counter for counting the number of sampled scan signals received, and comparator means, responsive to a second portion of said integral of said magnification value and to said counter, for providing an integration control signal to said integrator means.

8. The system of claim 1 in which said magnification value equals the reciprocal of said desired magnification of the image.

9. A method of providing a sequence of output scan values differing in number from a sequence of sample scan signals produced during optical scanning of an image such that the output scan values specify an image which differs in size from the optically scanned image, comprising the steps of:

optically scanning an image to provide a sequence of sample scan signals, each such sample scan signal being representative of the image density at an associated pixel location in a row of pixel locations across the image, converting said sequence of sample scan signals to a corresponding sequence of digital scan values, and sampling said sequence of digital scan values at predetermined evenly spaced points in said sequence by interpolating between pairs of successive digital scan values to provide a sequence of output scan values differing in number from said sequence of digital scan values, the spacing between said evenly spaced points being determined by the change in image size to be effected.

10. The method of claim 9 in which said step of sampling said sequence of digital scan values includes the step of sampling said sequence of digital scan values at a frequency greater than that of said sequence of digital scan values, whereby image enlargement is produced.

11. The method of claim 9 in which said step of sampling said sequence of digital scan values includes the step of sampling said sequence of digital scan values at a frequency less than that of said sequence of digital scan values, whereby image reduction is produced.

12. The method of claim 9 in which said step of optically scanning includes the step of providing a succession of sequences of sample scan signals, each of said sequences representative of the image density at associated pixel locations in an associated row across the image, said rows being spaced apart in a direction perpendicular thereto by a selected distance.

* * * * *